United States Patent [19]

Grubbs et al.

[11] 4,119,106
[45] Oct. 10, 1978

[54] FLAVORANT-RELEASE RESIN COMPOSITIONS

[75] Inventors: Harvey J. Grubbs, Mechanicsville; Thomas V. Van Auken; William R. Johnson, Jr., both of Richmond, all of Va.

[73] Assignee: Philip Morris, Incorporated, New York, N.Y.

[21] Appl. No.: 728,729

[22] Filed: Oct. 1, 1976

Related U.S. Application Data

[63] Continuation-in-part of Ser. No. 624,900, Oct. 22, 1975, abandoned.

[51] Int. Cl.$^2$ .................. A24B 3/12; C08F 18/24; C07C 69/96
[52] U.S. Cl. ............... 131/17 R; 131/17 A; 260/463; 426/538; 526/309; 526/314
[58] Field of Search .............. 260/463, 77.5 UA; 131/17, 144, 15; 426/534, 538

[56] References Cited

U.S. PATENT DOCUMENTS

| 3,111,127 | 11/1963 | Jarboe et al. | 131/17 R |
| 3,126,012 | 3/1964 | Jarboe et al. | 131/17 R |
| 3,128,772 | 4/1964 | Jarboe et al. | 131/17 R |
| 3,312,226 | 4/1967 | Bavley et al. | 131/17 R |
| 3,332,428 | 7/1967 | Mold et al. | 131/17 R |
| 3,419,543 | 12/1968 | Mold et al. | 131/17 R |
| 3,499,452 | 3/1970 | Kalliianos et al. | 131/17 R |
| 3,542,677 | 11/1970 | Theimer | 131/17 R |
| 3,589,372 | 6/1971 | Theimer | 131/17 R |
| 3,887,603 | 6/1975 | Rundberg, Jr. et al. | 260/463 |
| 4,033,993 | 7/1977 | Bruns et al. | 260/463 |

Primary Examiner—Robert W. Michell
Assistant Examiner—V. Millin
Attorney, Agent, or Firm—Depaoli & O'Brien

[57] ABSTRACT

This invention provides alcohol flavorant-release oligomeric and polymeric derivatives corresponding to the structural formula:

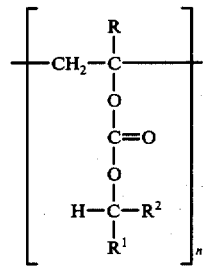

wherein R is selected from aliphatic, alicyclic, heterocyclic and aromatic hydrocarbon radicals; $R^1$ and $R^2$ are selected from hydrogen and aliphatic, alicyclic, heterocyclic and aromatic hydrocarbon radicals; and $n$ is an integer.

12 Claims, No Drawings

FLAVORANT-RELEASE RESIN COMPOSITIONS

This application is a CIP of Ser. No. 624,900 filed Oct. 22, 1975 which is now abandoned.

BACKGROUND OF THE INVENTION

The incorporation of flavorants in tobacco products is an important development in the tobacco industry due to the lowered aromaticity of the available tobacco and to the increased preference of some smokers for filter cigarettes and low delivery cigarettes. The addition of certain desirable flavorants to tobacco is limited by their volatility which causes them to be lost or diminished in quantity during processing and storage of the tobacco product. This problem is even more acute for filter cigarettes containing active adsorbent, such as charcoal, in the filters. During the processing and storage of this type of product, volatile flavorants migrate from the tobacco and are irreversibly bound by the active adsorbent, thereby depleting the flavorant in the product and possibly altering the effectiveness of the active adsorbent in its selective removal of undesirable smoke components.

Menthol is a flavorant which has received high acceptance as an additive to tobacco products because of the pleasant cooling effect and desirable aroma and flavor characteristics which it imparts to the smoke. Its high degree of volatility and ease of sublimation have presented problems in the manufacturing operations and, in addition, have resulted in a decreased shelf-life of the product due to losses of menthol by diffusion on storage.

In an attempt to alleviate these problems, it has been suggested that menthol might be adsorbed on a suitable support, such as activated charcoal or fuller's earth, and that the resultant composition might then be added to the tobacco. Attempts to pursue this method have not been satisfactory. The menthol yields from such adsorbents have been found to be very low. Moreover, this method obviously necessitates incorporation of the adsorbent into the tobacco, and such a foreign material can result in an undesirable appearance as well as give rise to uneven burning of the tobacco.

In order to overcome these difficulties, menthol has been incorporated into the tobacco as a part of a compound (i.e., a menthol-release agent) in such form that upon burning of the tobacco, the compound is decomposed to yield the desired menthol flavorant. While considerably more satisfactory than earlier attempts, even this technique has evidenced certain drawbacks.

Bavley et al, U.S. Pat. No. 3,312,226, describes a process whereby menthol is incorporated into tobacco as the carbonate ester of various alcohols, particularly one such as linalool, which are themselves useful flavorants. Upon pyrolysis of these carbonate esters, incident to the normal burning temperatures of the tobacco, the menthol is released to flavor the smoke. However, these simple carbonate esters have not proven wholly satisfactory. They retain one of the difficulties of menthol itself, in that they are somewhat susceptible to migration in the tobacco, and thereby prevent the strict control of quantitative release of menthol to the tobacco smoke during burning. Additionally, the second alcohol of the carbonate ester can prove susceptible to chemical alteration during pyrolysis, thus giving rise to undesirable chemical fragments which can add a chemical aftertaste to the smoke.

The Mold et al U.S. Pat. Nos. 3,332,428 and 3,419,543, offer a slightly different approach to the problem of adding menthol flavor to a tobacco smoke. These patents, like that of Bavley et al, rely upon the formation of a carbonate ester to bind the menthol in a release agent. Here, however, a polyhydroxy compound such as monosaccharide, disaccharide, trisaccharide, polysaccharide, or glycol is used to fix the menthol in the tobacco. Again there are certain drawbacks. Because the alcohol linkages of these saccharides and glycols are only primary or secondary in character, the efficiency with which the menthol can be regenerated upon pyrolysis is limited.

The Rundberg, Jr. et al U.S. Pat. No. 3,887,603 describes the development of a new type of menthol-release agent for imparting menthol flavor to tobacco smoke with a high efficiency of menthol release upon pyrolysis under normal smoking conditions. The menthol-release agent is a polymeric l-methyl carbonate ester composition characterized by the presence of a tertiary alcohol ester attachment.

In addition to menthol, a variety of other flavorants have been developed and proposed for incorporation into tobacco products. Illustrative of such tobacco flavorants are those described in U.S. Pat. Nos. 3,580,259; 3,625,224; 3,722,516; 3,750,674; 3,879,425; 3,881,025; 3,884,247; 3,890,981; 3,903,900; 3,914,451; 3,915,175; 3,920,027; 3,924,644; 3,937,228; 3,943,943; 3,586,387; and the like. The tobacco flavorants include compounds such as succinic anhydride; dihydroxyacetone; substituted pyridines; cinnamic derivatives; isovaleric acid; 6-methylhepta-3,5-diene-2-one; 2-butyl-2-butenal; 1,2-cyclohexanediene, alpha-pyrones; substituted butyrolactones; pyrazines and thiazolidines; and the like.

U.S. Pat. No. 3,139,888 suggests the use of isoprenoid alcohols to impart desirable flavor to tobacco. U.S. Pat. No. 3,589,372 recommends the incorporation of a polyisoprenoid hydrocarbon into tabacco products as a flavor enhancer.

The use of the diverse types of tobacco flavorants is characterized by various disadvantages. Some flavorants are prohibitively expensive. Other flavorants are complex mixtures of variable constituency and are inconsistent in effect. Other flavorants are too volatile for cigarette packaging and storage purposes. Still other prior art flavorants have a flowery fragrance which impart undesirable aroma characteristics to tobacco products or which do not adequately improve the taste, character, and flavor of smoking tobacco.

Accordingly, it is a main object of this invention to provide a tobacco flavorant which is characterized by lack of mobility and/or volatility at ambient temperature when incorporated in a tobacco composition.

It is another object of this invention to provide a novel polymeric composition which is adapted to release alcohol flavorant of enhancing character to tobacco smoke under normal smoking conditions, with optimal efficiency and without masking of the natural flavor of the resultant main stream tobacco smoke.

It is a further object of this invention to provide a polymeric composition which is adapted to release menthol to tobacco smoke under normal smoking conditions with nondeleterious effect on the flavor of the resultant tobacco smoke.

Other objects and advantages of the present invention shall become apparent from the following description and examples.

DESCRIPTION OF THE INVENTION

One or more objects of the present invention are accomplished by the provision of an alcohol flavorant-release carbonate ester resin composition having a molecular weight in the range between about 500 and 2,000,000 and consisting essentially of recurring monomer units corresponding to the formula:

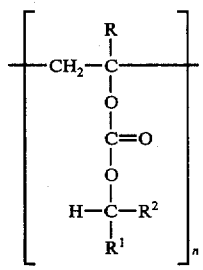

wherein R is a member selected from the group consisting of aliphatic, alicyclic, heterocyclic and aromatic hydrocarbon radicals containing between 1 and about 10 carbon atoms; $R^1$ and $R^2$ are members independently selected from the group consisting of hydrogen and aliphatic, alicyclic, heterocyclic and aromatic hydrocarbon radicals, and $R^1$ and $R^2$ taken together with the connecting elements form an alicyclic structure, and wherein the total number of carbon atoms in $R^1$ and $R^2$ collectively does not exceed about 20; and $n$ is an integer between 2 and about 10,000.

In the carbonate ester resin formula hereinabove, R is preferably an aliphatic radical containing between 1 and about 6 carbon atoms, such as methyl, ethyl, propyl, isobutyl, pentyl, and the like. Preferred alicyclic R radicals are those containing between about 3 and 10 carbon atoms, such as cyclopropyl, cyclobutyl, cyclopentyl, cyclohexyl, and the like, and alkyl-substituted derivatives thereof. Preferred aromatic R radicals are those containing between 6 and 10 carbon atoms such as phenyl, tolyl, xylyl, and the like, and phenylalkyl radicals such as benzyl, phenylethyl, phenylpropyl, and the like. It is highly preferred that the R radical is selected from lower alkyl and phenyl substituents.

$R^1$ and $R^2$ are preferably hydrogen or an aliphatic radical containing between 1 and about 6 carbon atoms, such as methyl, ethyl, propyl, isobutyl, pentyl, and the like. Preferred alicyclic $R^1$ and $R^2$ radicals are those containing between about 3 and 10 carbon atoms, such as cyclopropyl, cyclobutyl, cyclopentyl, cyclohexyl, and the like, and alkyl-substituted derivatives thereof. Preferred aromatic $R^1$ and $R^2$ radicals are those containing between 6 and about 10 carbon atoms such as phenyl, tolyl, xylyl, and the like, and phenylalkyl radicals such as benzyl, phenylethyl, phenylpropyl, and the like. In an important embodiment, $R^1$ and $R^2$ taken together with the connecting elements form an alicyclic structure such as the menth-1-yl radical.

As it is apparent, the R, $R^1$ and $R^2$ radicals described herein can include other elements in addition to hydrogen and carbon, e.g., oxygen and nitrogen. Such elements can be in the structural form of alkoxy, alkyleneoxy, carbonyl, carbalkoxy, epoxy, amino, and the like, and in radical forms of heterocyclic structures such as pyrrole, imidazole, indole, pyridine, pyrazine, piperidine, piperazine, furan, pyran, morpholine, and the like. Preferred radicals of this type include

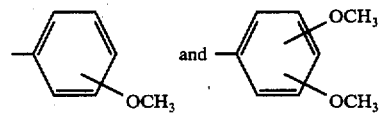

An interesting carbonate ester resin composition is one in which $R^1$ is ethyl and $R^2$ is the anisyl radical.

Preparation Of Carbonate Ester Resin Compositions

The low molecular weight oligomeric and polymeric alcohol flavorant-release carbonate ester resin compositions of the present invention, which consist essentially of the recurring monomer units structurally represented hereinabove, can be prepared by the polymerization of α-substituted-vinyl carbonate ester compounds having the formula:

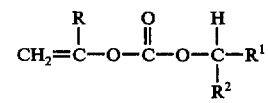

wherein R is a member selected from the group consisting of aliphatic, alicyclic, heterocyclic and aromatic hydrocarbon radicals containing between 1 and about 10 carbon atoms, $R^1$ and $R^2$ are members independently selected from the group consisting of hydrogen and aliphatic, alicyclic, heterocyclic and aromatic hydrocarbon radicals, and $R^1$ and $R^2$ taken together with the connecting elements form an alicyclic structure, and wherein the total number of carbon atoms in $R^1$ and $R^2$ collectively does not exceed about 20.

The α-substituted-vinyl carbonate ester compounds can be synthesized conveniently from readily available starting materials by a method which comprises reacting a haloformate with an enolate in the following manner:

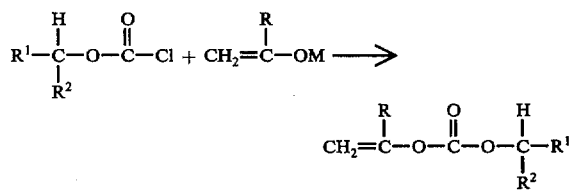

In a preferred synthesis procedure, the enolate is prepared by treating a metal hydride (e.g., an alkali metal hydride) with an appropriate R radical substituted methyl ketone in a solvent at 0° C.:

wherein M is alkali metal. In a second step, the enolate so prepared is added dropwise to a cooled solution of an appropriate chloroformate. Suitable solvents include benzene, toluene, dioxane, tetrahydrofuran, dimethylsulfoxide, dimethoxyethane, and the like.

The chloroformate reactant can be prepared by the reaction of a selected alcohol and phosgene ($COCl_2$) at a temperature between about 5° C. and 35° C. in a solvent such as benzene, cyclopentane or ether. The phosgene is preferably added in substantial molar excess of the alcohol, and an appropriate catalyst (e.g., pyridine or quinoline) can be employed in such an amount as to facilitate the reaction. The reaction mass is stirred for a total of about 3 hours and then allowed to stand overnight. At the end of this time, the desired chloroformate is usually recovered as a slightly yellow liquid.

The α-substituted-vinyl carbonate ester compounds can be converted into the alcohol flavorant-release oligomeric and polymeric compositions of the present invention employing conventional procedures for vinyl homopolymerization. The polymerization is normally conducted at a temperature in the range between about 20° C. and 100° C. under an inert atmosphere in the presence of a free radical generating catalyst. Suitable catalysts include peroxide compounds such as benzoyl peroxide, cumene hydroperoxide, methyl ethyl ketone peroxide, and the like, azo compounds such as 2,2'-azobisisobutyronitrile, and the like, and other known catalyst systems such as trialkylboron and oxygen (trace), trialkylaluminum and oxygen (trace), and the like. Typical polymerization accelerators such as cobalt compounds, sulfur compounds or amine compounds may also be employed in conjunction with the polymerization catalyst.

The present invention alcohol flavorant-release oligomeric and polymeric compositions can vary over a wide range of molecular weight, but preferably the molecular weight is maintained in the range between about 1500 and 15,000.

Generally, the number of recurring monomeric units will vary between 2 and about 10,000. For application as alcohol flavorant-release agents in tobacco compositions, it is preferred that the average number of recurring monomeric units in the polymeric compositions be maintained in the range between about 5 and 50.

Smoking Tobacco Composition

In an important embodiment, the present invention provides a smoking composition which comprises an admixture of natural or reconstituted tobacco and between about 0.001 and 10 weight percent, based on the weight of tobacco, of an alcohol flavorant-release agent which corresponds to the structural formula set forth hereinabove in definition of the present invention polymers of α-substituted-vinyl carbonate esters.

The invention alcohol flavorant-release carbonate ester resin composition can be incorporated into the tobacco in accordance with methods known and used in the art. Preferably the alcohol flavorant-release agent is dissolved in a solvent such as acetone or cyclohexane and then sprayed or injected into the tobacco matrix. Such method ensures an even distribution of the flavorant-release agent throughout the tobacco, and thereby facilitates the production of a more uniform smoking tobacco composition.

In another method of incorporation into tobacco, the alcohol flavorant-release carbonate ester resin composition can be admixed in solid form with the components of a reconstituted sheet of tobacco prior to the forming of the sheet.

In accordance with this invention, there is substantially no loss of alcohol flavorant through sublimation or volatilization thereof during the manufacturing and storage operations incident to the production of a useful smoking composition. Additionally, the drawbacks of diffusion of a flavorant such as menthol, or of a menthol-release agent, within the tobacco are successfully eliminated, and the control of quality of uniformity within the product tobacco compositions is successfully maintained.

Further, the non-alcohol residue resultant from the pyrolysis, incident to normal smoking, of a present invention smoking tobacco composition is non-deleterious to the flavor of the tobacco smoke. A present invention alcohol flavorant-release carbonate ester resin composition functions to liberate alcohol flavorant with optimal efficiency, incident to normal smoking. The present invention flavorant-release resin compositions contain a maximized weight percent alcohol flavorant available for release, thereby permitting the quantity of said alcohol flavorant-release agent required to be incorporated in a tobacco composition to be minimized.

In a further embodiment, the present invention also contemplates the incorporation of one of the alcohol flavorant-release carbonate ester resin compositions described above into an article of manufacture which is burned under controlled conditions within the environment of a human habitat. In particular, the combustible articles contemplated are those such as candles, room deodorizers, manufactured fireplace fuel, and the like, the burning of which evolves a gasiform effluent which can be sensed by persons within olfactory proximity. As it is apparent, wood logs can also be treated with a solution of a carbonate ester resin composition prior to ignition in a fireplace.

The incorporation of between about 0.1 and 10 weight percent of a present invention carbonate ester resin composition into a candle, for example, can introduce a pleasant aroma or fragrance into a confined living space when the candle is lighted.

The following examples are further illustrative of the present invention. The reactants and other specific ingredients are presented as being typical, and various modifications can be derived in view of the foregoing disclosure within the scope of the invention.

EXAMPLE I

Preparation of α-Methylvinyl l-Menthyl Carbonate

Potassium hydride (0.5 mole, 81.0 g of 24.76% oil dispersion) was washed with anhydrous ethyl ether under nitrogen to remove the oil. After removal of the oil, 400 mls of anhydrous tetrahydrofuran was added and the resulting suspension was stirred and cooled to 0° C. in an ice/salt bath. Acetone (0.5 mole, 29.0 g) was added dropwise to the stirred suspension, such that the reaction temperature did not exceed 5° C. The reaction was complete when hydrogen evolution stopped.

The resulting clear yellow solution was added to l-menthyl chloroformate (0.48 mole, 104.7 g) in 500 mls of anhydrous tetrahydrofuran with stirring at 0° C. Addition was regulated such that the temperature did not exceed 5° C. After completion of addition, the reaction mixture was stirred for 24 hours at room temperature. The reaction mixture was worked up by adding 1 liter of water and 300 mls of ethyl ether. The first water wash was back-extracted with three 100 ml portions of ethyl ether and all of the ether solutions were combined. The combined ether extracts were washed with four 1 liter portions of water. The ether solution was dried over anhydrous magnesium sulphate for 16 hours. After filtration and solvent evaporation, the resulting oil was distilled through a molecular still at 0.07 mm pressure and at 125° C. A yield of 73.85 g (65.4%) was obtained.

Elemental Analysis: Found: C, 70.03; H, 10.46; Calc: C, 69.96; H, 10.06;

EXAMPLE II

Preparation of α-Styryl l-Menthyl Carbonate

Potassium hydride (0.095 mole, 15.36 g of a 24.76% oil dispersion) was placed in the upper vessel of a Grignard flask and washed with anhydrous ethyl ether to remove the oil. Freshly distilled dimethoxyethane (200 mls) was added and the resulting suspension was stirred with cooling in an ice/salt bath. Acetophenone (0.10 mole, 12.15 g) was added slowly such that the temperature did not rise above 9° C. The mixture was stirred for 1 hour after completion of addition and then was added slowly to l-menthyl chloroformate (0.095 mole, 20.8 g) in 100 mls of dimethoxyethane which had been maintained at 4° C. The addition was carried out such that the temperature did not rise above 11° C. The mixture was stirred and allowed to warm to room temperature overnight after completion of addition.

The reaction mixture was poured into 500 mls of water and extracted with three 200 ml portions of ethyl ether. The combined ethyl ether solutions were washed with 250 mls of water and subsequently with four 200 ml portions of water. The ether solution was dried over magnesium sulphate. After filtration and solvent evaporation, the residue obtained was purified by two molecular distillations. The first distillation was carried out at 78° C. and 0.27 mm pressure. The residue obtained (19.35 g) was distilled again at 180° C. and 0.01 mm pressure. A yield of 16.48 g (57.4%) was obtained.

Elemental Analysis: Found: C, 75.15; H, 8.70 Calc: C, 75.46; H, 8.70

EXAMPLE III

Preparation of Poly(α-Methylvinyl l-Menthyl Carbonate)

α-Methylvinyl l-menthyl carbonate (71.00 g) was placed in a polymerization apparatus which was previously dried at 105° C. and allowed to cool under a positive pressure of dry nitrogen. Benzoyl peroxide (4.26 g) was added and the monomer/ peroxide mixture was stirred with a stream of dry nitrogen introduced under the surface of the monomer for 30 minutes. The nitrogen stream was stopped and the apparatus was placed under a slight positive pressure with dry nitrogen and heated to 75° C. by a thermostated oil bath. The mixture was allowed to polymerize at 75° C. for 72 hours. After polymerization, the sample was allowed to cool to room temperature and a solid mass was obtained. The polymer mass was dissolved in 100 mls of dichloromethane and the solution was added slowly to 1.5 liters of methyl alcohol with vigorous stirring. A fine white precipitate formed and was filtered and dried under reduced pressure (0.05 mm, 72 hours) at room temperature. A yield of 55.33 g of polymer (78.2%) was obtained.

Elemental Analysis: Found: C, 70.34; H, 10.15; Calc: C, 69.96; H, 10.07

EXAMPLE IV

Preparation of Poly(α-Styryl l-Menthyl Carbonate)

α-Styryl l-menthyl carbonate (8.02 g) and benzoyl peroxide (0.40 g) were placed in a round bottom flask and stirred with a stream of dry nitrogen introduced under the liquid surface for 3 hours. The nitrogen stream was stopped and the flask was placed under a slight positive pressure with dry nitrogen and was heated to 76° C. The mixture was allowed to polymerize at 76° C. for 72 hours, and then cooled to room temperature. The polymer was dissolved in 13 mls of dichloromethane and the solution was added slowly to 300 mls of methyl alcohol with vigorous stirring. The fine white precipitate which formed was filtered and then dried under reduced pressure (0.05 mm, 16 hours) at room temperature. A yield of 2.31 g of polymer (28.8%) was obtained.

Elemental Analysis: Found: C, 75.62; H, 8.54; Calc: C, 75.46; H, 8.67

EXAMPLE V

Preparation of a Smoking Composition

A solution of poly(α-methylvinyl l-menthyl carbonate) in cyclohexane was sprayed onto tobacco. The amount of polymer applied was 1.74% of the weight of the tobacco. Cigarette rods (60 mm) were made by machine with treated tobacco weights of 780 mg per cigarette. Active-carbon filters were attached and 52 mm of the rod was consumed by machine smoking the cigarettes in the standard manner of taking 35 ml puffs of two seconds duration each minute. Menthol delivery to the mainstream smoke was 0.36 mg with the filter retaining 0.62 mg. The efficiency of the filter in terms of removing gas phase components from the smoke was the same as that obtained when identical filters were used on control cigarette rods which contained no added polymer.

EXAMPLE VI

Preparation of a Smoking Composition

Poly(α-styryl l-menthyl carbonate) was added to tobacco in the same manner as the polymer of Example 5 (2.2% added, based on tobacco weight). Cigarettes (780 mg treated tobacco per cigarette) on smoking produced smoke deliveries of 0.23 mg of menthol per cigarette. Menthol retention in the filters averaged 0.46 mg per cigarette.

EXAMPLE VII

Storage Stability of a Smoking Composition

Cigarettes of Example 6 were carried through two cycles of accelerated aging by placing them in a room maintained at 110° F. and a relative humidity (RH) of 15% for seven days, and four days in a room maintained at 90° F. and 85% RH, and then repeating the cycle. Analysis of the filters before smoking showed that no menthol had migrated from the tobacco to the filter. On smoking, the menthol delivery to mainstream smoke was 0.24 mg, a value not different from that obtained with unaged cigarettes.

EXAMPLE VIII

Preparation of Smoking Compositions

Tobacco which contained 2.37% poly(α-methylvinyl l-menthyl carbonate) that had been added in cyclohexane solution was made into 85 mm cigarettes which consisted of 65 mm of the treated tobacco and 20 mm of a conventional cellulose acetate filter. The weight of the treated tobacco per cigarette was 820 mg. Smoking 55 mm of the cigarettes in the standard manner yielded 0.44 mg of menthol in mainstream smoke. The filter retained 0.97 mg of menthol.

In the same manner, cigarettes were prepared with 1.7% of the polymer added to the tobacco, and yielded 0.24 mg of menthol to the smoke and 0.60 mg to the filter when smoked in the standard manner.

EXAMPLE IX

Preparation of α-Cyclopropylvinyl l-Menthyl Carbonate

Potassium hydride (0.20 mol, 32.4 g of a 24.76% oil dispersion) was washed with anhydrous ethyl ether to remove the oil. After removal of the oil, 300 mls of anhydrous tetrahydrofuran was added and the resulting suspension was stirred and cooled to 0° C in an ice/salt bath. Cyclopropyl methyl ketone (0.20 mol, 16.81 g) was added dropwise to the stirred suspension such that the reaction temperature did not exceed 3° C. The reaction was complete when hydrogen evolution stopped.

The resulting clear yellow solution was added to l-menthyl chloroformate (0.18 mol, 38.7 g) in 400 mls of anhydrous tetrahydrofuran with stirring at 0° C. Addition was regulated such that the temperature did not exceed 3° C. After completion of the addition, the reaction mixture was stirred for 16 hours at room temperature. The reaction mixture was worked up by adding 400 mls of water and 400 mls of ethyl ether. The ether solution was dried over magnesium sulphate for 16 hours. After filtration and solvent evaporation, a yellow slurry was obtained. Methyl alcohol (200 mls) was added and the resulting suspension was cooled with stirring in an ice-water bath. The suspension was filtered, and the methyl alcohol solution obtained was evaporated to yield 36.0 g (72%) of yellow oil. An infrared spectrum provided the following support of structure:

| Functionality | Band Position |
|---|---|
| $H_2C=C-O-C-O-$ with carbonyl | 1770 cm$^{-1}$ |
|  | 1665 cm$^{-1}$ |
|  | 1250 cm$^{-1}$ |
| cyclopropyl CH$_2$/CH | 3100 cm$^{-1}$ |
|  | 3020 cm$^{-1}$ |
| $(H_3C)_2CH-$ | 1392 cm$^{-1}$ |
|  | 1376 cm$^{-1}$ |

EXAMPLE X

Preparation of Poly(α-Cyclopropylvinyl l-Menthyl Carbonate)

α-Cyclopropylvinyl l-methyl carbonate (6.0 g) from Example IX was fractionated and a center cut (b.p. 85°–90° C./0.11 mm) of 1.97 g was obtained. A charge of 1.26 g of the monomer was placed in a polymerization apparatus which was previously dried at 105° C. and cooled under a positive pressure of dry nitrogen. Benzoyl peroxide (75.6 mg) was added and the monomer/peroxide mixture was stirred with a stream of dry nitrogen introduced under the surface of the monomer for 30 minutes. The nitrogen stream was stopped and the apparatus was placed under a slight positive pressure with dry nitrogen and heated to 75° C.

The mixture was allowed to polymerize at 75° C. for 72 hours. After 72 hours, the mixture was cooled to room temperature at which time a gel was obtained. The polymer mass was dissolved in 2.5 mls of methylene chloride and added slowly to 25 mls of methyl alcohol cooled in a dry ice/2-propanol slush. A finely divided white precipitate was formed which agglomerated on warming to room temperature. The precipitation was repeated for two additional cycles. The solid polymer obtained after final filtration was dried under reduced pressure (0.05 mm, 72 hours) at room temperature. A yield of 0.67 g (53%) of a glassy solid, which possessed no odor of menthol but which released the odor of menthol on heating, was obtained.

Elemental Analysis: Found: C, 72.08; H, 9.75; Calc: C, 72.14; H, 9.84;

EXAMPLE XI

Preparation of 3,3-Dimethylbut-1-en-2-yl l-Menthyl Carbonate

To a suspension of 4.01 g (0.10 mol) of potassium hydride in 200 ml of freshly distilled tetrahydrofuran, cooled to 5° C. and stirred, 10.16 g (0.10 mol) of 3,3-dimethylbutan-2-one was added dropwise. Hydrogen gas was evolved rapidly, and the gray suspension became a yellow solution. Stirring was continued for 5 minutes after addition. Then the entire reaction mixture was added slowly with stirring to 20.8 g (0.095 mol) of menthyl chloroformate in 200 mls of tetrahydrofuran. Addition was carried out at a rate which allowed the temperature to remain below 10° C. After completion of the addition, the reaction mixture was stirred for 24 hours and allowed to warm slowly to ambient temperature.

The reaction mixture was poured into a mixture of 500 mls of water and 500 mls of ether. Phases were separated after equilibration. The aqueous phase had a pH of 7. The ether layer was extracted with four 500 ml portions of water, and was subsequently dried over magnesium sulfate. Removal of solvent under reduced pressure left a residue weighing 26.71 g. An aliquot weighing 11.00 g was distilled through a short-path microware still.

| Fraction | B.P.(° C) | P(mm) | Weight(g) |
|---|---|---|---|
| 1 | 61° | 0.08 | 1.10 |
| 2 | 90°–100° | 0.15–0.13 | 6.50 |
| 3 | 95°–100° | 0.13–0.14 | 1.06 |
| Residue |  |  | 1.90 |
|  |  | Total | 10.56 |

On this basis, the total yield of the carbonate was calculated to be 21.03 g (0.075 mol, 78.4%).

Elemental Analysis: Found: C, 72.47; H, 10.72; Calc: C, 72.30; H, 10.71;

EXAMPLE XII

Preparation of Poly(3,3-Dimethylbut-1-en-2-yl Menthyl Carbonate)

3,3-Dimethylbut-1-en-2-yl menthyl carbonate (3.0 g) and benzoyl peroxide (0.150 g) were degassed with a stream of nitrogen, and then heated at 75° C. for 5 days. After cooling, the reaction mixture was dissolved in methylene chloride, and the methylene chloride solution was added to 25 ml of methanol, producing a tacky gum. The tacky gum was redissolved in 4 mls of methylene chloride and 2 mls of isopropyl alcohol. The solution was added to 20 mls of methanol at −78° C. The resulting white precipitate was removed by vacuum filtration. Drying under vacuum yielded 0.85 g (28.3%) of odorless poly(3,3-dimethylbut-1-en-3-yl menthyl carbonate), which was determined by osmometry to have a molecular weight of 1220. When heated, the odor of menthol was evident.

EXAMPLE XIII

Comparison of Menthol-release Pyrolysis Data

A present invention composition, poly($\alpha$-styryl l-menthyl carbonate), and poly(1,1-dimethylallyl l-menthyl carbonate) in accordance with Rundberg et al (U.S. Pat. No. 3,887,603), were subjected to pyrolysis conditions to compare the menthol-release properties of the two compositions.

Each composition was pyrolyzed in a quartz-tube with a helium flow to carry the pyrolysis products into a gas chromatographic analysis system.

| Polymer | Temperature of Maximum Release (° C) | Percentage of Theoretically Available Menthol Released |
|---|---|---|
| Poly($\alpha$-styryl menthyl carbonate) | 200° | 90% |
| Poly(dimethyl allyl l-menthyl carbonate) | 350° | 83.8% |

A comparison of results indicated that the present invention composition released a higher percentage of l-menthol flavorant at a lower temperature than the Rundberg et al composition.

In the present invention, the term "menthol" is meant to include all of the stereoisomeric forms of menthol, taken singly or in admixture, which are known and used in the art as flavorants. l-Menthol is the preferred stereoisomeric form of menthol flavorant.

EXAMPLE XIV

Preparation Of Ethyl Isopropenyl Carbonate (a) A suspension of 23.7% potassium hydride in mineral oil (33.8 g total weight, 8.01 g potassium hydride, 0.20 mole) was washed with three 250-ml portions of pentane to remove the mineral oil, and the potassium hydride was suspended in 200 ml of anhydrous tetrahydrofuran. To this suspension 11.62 g (0.20 mole) of acetone in 200 ml of anhydrous tetrahydrofuran was added dropwise under a nitrogen atmosphere with stirring and cooling (ice-salt bath). The temperature of the reaction mixture was maintained below 5° C. during addition. The mixture was then stirred for an additional 10 minutes at 0° C.

(b) An aliquot (320 ml, 0.15 mole) of the potassium isopropenylate solution described in part (a) above was added slowly to a solution of 15.19 g (0.14 mole) of ethyl chloroformate in 250 ml of anhydrous tetrahydrofuran under a nitrogen atmosphere with cooling and stirring. During addition the temperature was maintained below 10° C. The reaction mixture was allowed to warm to ambient temperature with stirring for about 18 hours. It was then poured into 400 ml of diethyl ether and washed with four 500-ml portions of water. The ether layer was separated and dried over magnesium sulfate. Removal of solvent in a stream of nitrogen yielded a light red oil weighing 14.41 g, which on distillation gave 9.85 g (54.3%) of ethyl isopropenyl carbonate, b.p. 55°–56° C./29 mm. The identity of the compound was confirmed by spectral data.

EXAMPLE XV

Preparation Of Poly(Ethyl Isopropenyl Carbonate)

A mixture of 3.0 g of ethyl isopropenyl carbonate and 0.09 of benzoyl peroxide was heated at 75° C. under a nitrogen atmosphere for 48 hours. After cooling the mixture was dissolved in 10 ml of methylene chloride and the solution was added slowly to 100 ml of methanol. A tacky precipitate formed and agglomerated. It was precipitated twice more using the same procedure. The resulting tacky gum was converted on drying at ambient temperature and 0.05 mm for 48 hours into a rigid foam. On grinding, 1.18 g (39.3%) of poly(ethyl isopropenyl carbonate) was obtained as an odorless powder. Spectral data confirmed the identity of the compound.

EXAMPLE XVI

Preparation Of Benzyl Isopropenyl Carbonate

A dispersion of potassium hydride (81.0 g total weight, 0.50 mole) was washed under a nitrogen atmosphere with three 500-ml portions of anhydrous diethyl ether to remove mineral oil. The potassium hydride was then suspended in 500 ml of anhydrous tetrahydrofuran, and the suspension was cooled to 0° C. by means of an ice-salt bath.

Then 29.05 g (0.50 mole) of acetone was added slowly, keeping the reaction temperature below 3° C. An aliquot (110 ml, about 0.10 mole) of this solution was added to a solution of 16.2 g (0.095 mole) of benzyl chloroformate in 200 ml of anhydrous tetrahydrofuran under a nitrogen atmosphere and cooled by means of a salt-ice bath to 3° C. or less. After addition was complete, stirring and cooling were continued for 15 minutes, and then cooling was discontinued while stirring continued for about 18 hours. The reaction mixture was then poured into 300 ml of water, and the resulting solution was extracted with 400 ml of ether. The ether layer was separated, washed with four 400-ml portions of water, and dried over magnesium sulfate. Removal of solvent under reduced pressure left a residue weighing 16.21 g (88.8% crude yield). Vacuum distillation yielded three fractions.

| Fraction | b.p.(° C) | P(mm) | Weight |
|---|---|---|---|
| 1 | 30–60° | 0.20–0.22 | 1.26 |
| 2 | 61–83° | 0.20 | 2.24 |
| 3 | 84–88° | 0.20–0.18 | 5.76 |
| Residue | | | 4.33 |
| Total | | | 13.59 |

Fraction 3 was the purest sample of benzyl isopropenyl carbonate, as indicated by ir and nmr spectral analysis.

EXAMPLE XVII

Preparation Of Poly(Benzyl Isopropenyl Carbonate)

A mixture of 3.0 g of benzyl isopropenyl carbonate and 0.09 g of benzoyl peroxide was heated at 75° C. for 48 hours with stirring under a nitrogen atmosphere. The cooled reaction mixture was dissolved in 10 ml of methylene chloride. This solution was then added slowly to 150 ml of methanol with rapid stirring. A precipitate formed and agglomerated rapidly. Reprecipitation twice more using the same procedure produced a tacky mass which was converted by drying for 48 hours at ambient temperature and 0.05 mm pressure to foamed material. Grinding yielded 1.47 g (49%) of poly(benzyl isopropenyl carbonate).

EXAMPLE XVIII

Preparation Of 2-Phenylethyl Isopropenyl Carbonate (a) Potassium hydride dispersed in mineral oil (33.8 g total dispersion containing 23.79 weight percent potassium hydride, 8.01 g, 0.20 mole) was washed under a nitrogen atmosphere with three 250 ml portions of pentane to remove mineral oil. The residual potassium hydride was suspended in 200 ml of anhydrous tetrahydrofuran. This suspension was cooled by means of an ice-salt bath, and a solution of 11.62 g (0.200 mole) of acetone in 200 ml of anhydrous tetrahydrofuran was added at such a rate that the temperature of the reaction mixture did not exceed 5° C. After addition the reaction mixture was then stirred for 10 minutes.

(b) An aliquot (210 ml, 0.099 mole) of the solution described in part (a) above was added slowly to a solution of 17.55 g (0.095 mole) of 2-phenylethyl chloroformate in 150 ml of anhydrous tetrahydrofuran under a nitrogen atmosphere with stirring and cooling by means of a salt-ice bath. During the addition the temperature of the reactants did not exceed 10° C. Cooling was removed, and the reaction mixture was allowed to warm to ambient temperature and to stir for about 18 hours. The 250 ml of diethyl ether was added, and the mixture was washed successively with one 300-ml portion of water, two 400-ml portions of quarter-saturated aqueous sodium chloride solution, and finally one 400-ml portion of water. The ether layer was separated and dried over magnesium sulfate. Removal of solvent provided a residue weighing 18.83 g, which on distillation through a rotary thin film molecular still at 100° C. skin temperature and 0.09-0.10 mm pressure gave 10.21 g (52.1%) of 2-phenylethyl isopropenyl carbonate as a colorless liquid. Spectral data confirmed the identity of the compound.

EXAMPLE XIX

Preparation Of Poly(2-Phenylethyl Isopropenyl Carbonate)

2-Phenylethyl isopropenyl carbonate (4.0 g) and 0.12 g of benzoyl peroxide were warmed together at 75° C. for 48 hours with stirring under a nitrogen atmosphere. The cooled reaction mixture was dissolved in 5 ml of methylene chloride, and this solution was added slowly to 100 ml of methanol with rapid stirring. A tacky, oily solid agglomerated. This was dissolved again in 5 ml of methylene chloride, and re-precipitated in 100 ml of methanol. A total of three precipitations gave after drying at 0.05 mm and ambient temperature for 48 hours 2.35 g (58.8%) of poly(2-phenylethyl isopropenyl carbonate). The polymer was identified by spectral means.

When heated a sample of the polymer liberated the odor of 2-phenylethanol.

EXAMPLE XX

Preparation Of Citronellyl Isopropenyl Carbonate

To a solution of 20.78 g (0.095 mole) of citronellyl chloroformate in 150 ml of tetrahydrofuran was added under a nitrogen atmosphere with cooling and stirring an aliquot (215 ml, 0.101 mole) of the solution of potassium isopropenolate described in EXAMPLE XVIII. The reaction temperature did not rise above 10° C. during addition. After addition was complete the cooling bath was removed and the mixture was poured into 400 ml of diethyl ether, and washed successively with one 300-ml portion and three 400-ml portions of water. The ether layer was separated and dried over magnesium sulfate. Removal of solvent under reduced pressure left a red, slightly viscous residue weighing 20.83 g, which on distillation through a rotary thin-film molecular still at 75° C. skin temperature and 0.10-0.13 mm pressure yielded 12.97 g (56.8%) of citronellyl isopropenyl carbonate as a colorless liquid. The identity of the compound was confirmed by spectral data.

EXAMPLE XXI

Preparation Of Poly(Citronellyl Isopropenyl Carbonate)

A mixture of 3.00 g of citronellyl isopropenyl carbonate and 0.090 g of benzoyl peroxide was heated at 75° C. with stirring under a nitrogen atmosphere for 48 hours. The cooled mixture was then poured into 100 ml of methanol, causing formation of a cloudy suspension. When the mixture was cooled in ice water, a fine white precipitate was formed. Filtration and drying for 48 hours at 0.05 mm at ambient temperature yielded 0.46 g (15.3%) of poly(citronellyl isopropenyl carbonate).

The polymer had no odor of citronellol, but on heating citronellol aroma was evident.

EXAMPLE XXII

Preparation Of n-Hexyl Isopropenyl Carbonate

Potassium hydride dispersion (23.7%) in mineral oil (33.9 g total suspension, 8.02 g potassium hydride, 0.20 mole) was washed with three 300-ml portions of n-pentane. The potassium hydride was then suspended in 250 ml of anhydrous tetrahydrofuran, under a nitrogen atmosphere cooled to 5° C. with stirring. Acetone (11.6 g, 0.20 mole) in 200 ml of tetrahydrofuran was added slowly holding the temperature of the reaction mixture at 5° C.

The entire solution was then added slowly under a nitrogen atmosphere with stirring and cooling to 32.90 g (0.20 mole) of n-hexyl chloroformate in 40 ml of anhydrous tetrahydrofuran. The temperature of the reaction mixture was held below 5° C. during the addition and for 10 minutes afterwards. Cooling was then discontinued and stirring was continued for about 18 hours. The reaction mixture was then poured into 400 ml of diethyl ether, and the resulting mixture was washed with four 300-ml portions of water, and dried over magnesium sulfate. Removal of solvents under reduced pressure provided 41.4 g of light yellow residue. Distillation through a rotary thin film molecular still at 115° C. skin temperature and 0.15 mm pressure, followed by redistillation of the residue at 125° C. skin temperature and 0.10 mm pressure yielded 22.91 g (61.5%) of n-hexyl isopropenyl carbonate. The identity of the compound was identified by spectral data.

EXAMPLE XXIII

Preparation Of Poly(n-Hexyl Isopropenyl Carbonate)

A mixture of 8.0 g of n-hexyl isopropenyl carbonate and 450 mg of benzoyl peroxide was degassed by means of a stream of nitrogen, and then heated at 75° C. under a nitrogen atmosphere for 48 hours. After cooling, the light red mixture was dissolved in 15 ml of methylene chloride and added slowly to 250 ml of methanol with rapid stirring. The precipitate obtained was re-precipitated twice more by the same procedure. Drying of the tacky resin for 48 hours at 0.05 mm pressure and ambient temperature yielded 2.48 g (31.0%) of poly(n-hexyl isopropenyl carbonate).

EXAMPLE XXIV

Subjective Response To Poly(2-Phenylethyl Isopropenyl Carbonate) Incorporated In A Smoking Article Poly(2-phenylethyl isopropenyl carbonate), Example XIX, was dissolved in acetone, and portions of the solution were injected via a microsyringe into test cigarettes. The test cigarettes were: (a) regular filtered cigarettes delivering 17.9 mg/cigt. of FTC "tar", and (b) low delivery cigarettes giving 2 mg/cigt. of FTC "tar". The regular cigarettes were injected with sufficient solution to place 5 p.p.m. and 50 p.p.m. of polymer on the filler. The low delivery cigarettes were injected at the 50 p.p.m. level only. The cigarettes were then smoked by expert smokers, and compared to control cigarettes lacking the polymer. Their findings are summarized in the table below:

| Effects On The Tase Of Cigarette Smoke Of Poly(2-phenylethyl isopropenyl carbonate) In Cigarette Filler | | |
| --- | --- | --- |
| Polymer Level | Regular Cigarette (17.9 mg) | Low Delivery (2 mg) |
| 10 ppm | Adds sweetness, honey note, yeasty, metallic and increased harshness. | — |
| 50 ppm | Yeasty, bready, metallic, honey-like character, green note, added harshness. The sidestream had a honey-like note. | Bready, yeasty, and metallic. |

What is claimed is:

1. A polymeric composition having a molecular weight in the range between about 500 and 2,000,000 and consisting essentially of recurring monomer units corresponding to the formula:

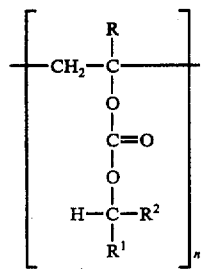

wherein R is a member selected from the group consisting of aliphatic, alicyclic, heterocyclic and aromatic hydrocarbon radicals containing between 1 and about 10 carbon atoms; $R^1$ and $R^2$ are members independently selected from the group consisting of hydrogen and aliphatic, alicyclic, heterocyclic and aromatic hydrocarbon radicals, or $R^1$ and $R^2$ taken together with the connecting elements form an alicyclic structure, and wherein the total number of carbon atoms in $R^1$ and $R^2$ collectively does not exceed about 20; and $n$ is an integer between 2 and about 10,000.

2. A polymeric composition in accordance with claim 1 wherein $n$ is an integer between about 5 and 50.

3. A polymeric composition in accordance with claim 1 wherein R is a member selected from the group consisting of aliphatic, alicyclic and aromatic hydrocarbon radicals containing between 1 and 10 carbon atoms.

4. A polymeric composition in accordance with claim 1 wherein $R^1$ and $R^2$ are members independently selected from the group consisting of hydrogen and aliphatic, alicyclic and aromatic hydrocarbon radicals, or $R^1$ and $R^2$ taken together with the connecting elements form an alicyclic structure, and wherein the total number of carbon atoms in $R^1$ and $R^2$ collectively does not exceed about 20.

5. A polymeric composition in accordance with claim 1 wherein $R^1$ is hydrogen and $R^2$ is methyl.

6. A polymeric composition in accordance with claim 1 wherein $R^1$ is hydrogen and $R^2$ is n-pentyl.

7. A polymeric composition in accordance with claim 1 wherein $R^1$ is hydrogen and $R^2$ is phenyl.

8. A polymeric composition in accordance with claim 1 wherein $R^1$ is hydrogen and $R^2$ is benzyl.

9. A polymeric composition in accordance with claim 1 wherein $R^1$ is hydrogen and $R^2$ is 2,6-dimethylhepten-5-yl.

10. A polymeric composition in accordance with claim 1 wherein $R^1$ is ethyl and $R^2$ is anisyl.

11. A polymeric composition in accordance with claim 1 wherein $R^1$ and $R^2$ taken together with the connecting elements form the menth-1-yl radical.

12. A smoking composition comprising an admixture of natural or reconstituted tobacco and between about 0.001 and 10 weight percent, based on the weight of tobacco, of a polymeric composition in accordance with claim 1 as an alcohol flavorant-release agent.

* * * * *

UNITED STATES PATENT OFFICE
CERTIFICATE OF CORRECTION

Patent No. 4,119,106  Dated October 10, 1978

Inventor(s) Harvey J. Grubbs et al

It is certified that error appears in the above-identified patent and that said Letters Patent are hereby corrected as shown below:

The expression "l-menthyl", every occurrence, should read --ℓ-menthyl--.

Column 5, line 68, "of quality of" should read --of quality and--.

Column 7, line 35, the illegible portion of the title should read --Carbonate)--.

Signed and Sealed this

Tenth Day of March 1981

[SEAL]

Attest:

Attesting Officer

RENE D. TEGTMEYER

Acting Commissioner of Patents and Trademarks